Figure 1:
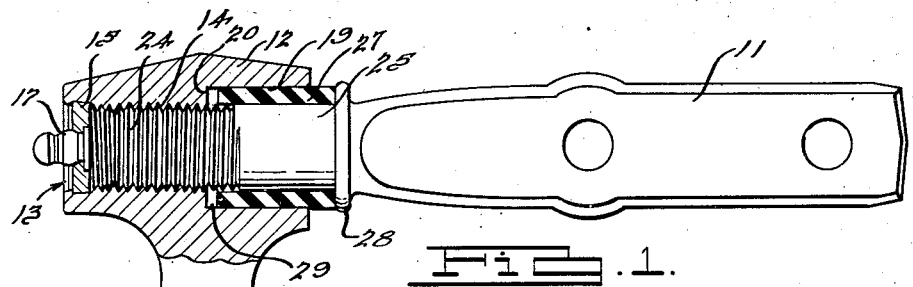

May 14, 1946.          J. W. LEIGHTON          2,400,238
COMBINED THREAD AND RUBBER BEARING

Filed Jan. 11, 1945

INVENTOR.
John W. Leighton
BY
Harness, Dickey & Pierce
ATTORNEYS.

Patented May 14, 1946

2,400,238

UNITED STATES PATENT OFFICE 2,400,238

COMBINED THREAD AND RUBBER BEARING

John W. Leighton, Port Huron, Mich.

Application January 11, 1945, Serial No. 572,287

7 Claims. (Cl. 287—85)

The invention relates to oscillatory connections such as used in motor vehicles for connecting relatively movable parts.

One object of the present invention is to provide an improved type of oscillatory connection embodying a threaded bearing wherein improved means is employed for dampening noise in the bearing such as may possibly occur where the load reverses in direction.

Another object of the invention is to provide an improved oscillatory connection wherein a resilient material is employed in conjunction with threads to form the bearing between the parts connected.

Another object of the invention is to provide an improved connection such as last indicated wherein the resilient material also acts as a lubricant seal.

Another object of the invention is to provide an improved U-bolt shackle which can be manufactured at a reduced cost.

And in general it is an object of the invention to provide an improved oscillatory connection which has the advantages of both the threaded bearing and a resilient bearing such as one composed of rubber or rubber-like material.

Other objects of the invention will become apparent from the following specification, from the drawing relating thereto, and from the claims hereinafter set forth.

Figure 2:
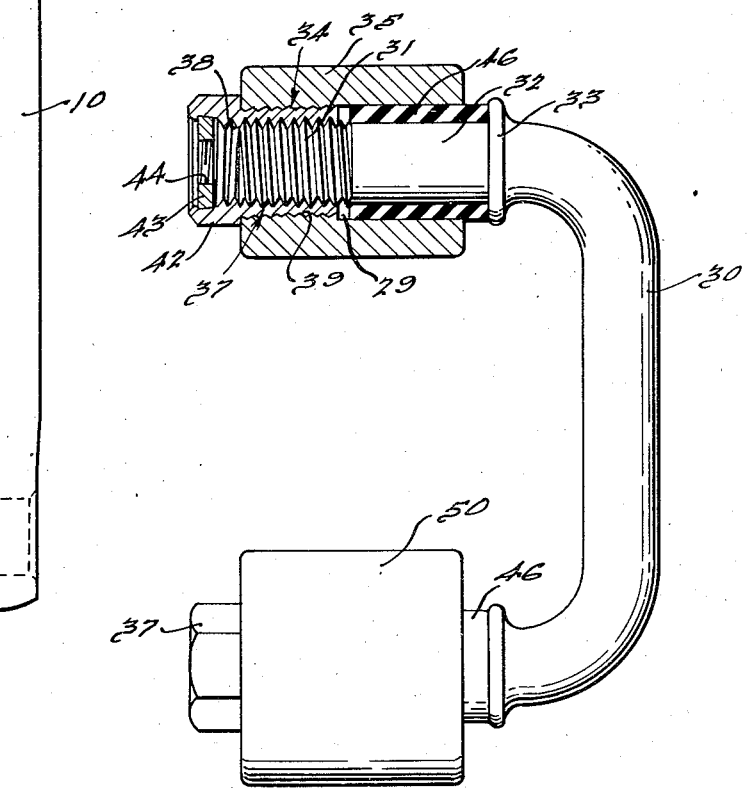

For a better understanding of the invention reference may be had to the drawing wherein:

Figure 1 is a side view, partly in cross section, illustrating an oscillatory connection constructed according to one form of the invention; and, Fig. 2 is a side view, partly in cross section, of an improved U-bolt shackle constructed according to one form of the invention.

Referring to Fig. 1, the oscillatory connection illustrated joins a steering idler arm 10 to a supporting bar 11 adapted to be bolted to the frame of the vehicle. It should be evident however, that these parts are illustrative only and that the connection may be used to connect various other parts wherein an oscillatory joint is desired. In the particular structure shown, the arm 10 may oscillate through a substantial degree during use of the steering gear.

The pivoted end of the arm 10 is enlarged as indicated at 12 and this enlarged portion has an opening 13 extending transversely of the length of the arm. One end portion of this opening is threaded as indicated at 14 and at the outer end of the threads the opening is closed by a welch plug 15 having a grease fitting 17. The other end portion of the opening is enlarged as indicated at 19, thereby providing a shoulder 20 at the junction of the two portions of the opening and this enlarged portion is non-threaded.

The bar 11 has a trunnion portion at one end comprising a threaded end sector 24 threaded into the threaded portion 14 of the opening and a non-threaded sector 25 disposed in the enlarged portion 19 of the opening. Within the enlarged portion 19 of the opening a rubber sleeve or bushing 27 is provided and for preventing movement of the bushing out of the opening during use of the joint, an annular shoulder 28 is provided on the trunnion beyond the outer end of the bushing. A small space 29 may be present between the inner end of the bushing and shoulder 20 to allow for variations in dimensions between the shoulders 20 and 28.

During use of the joint, oscillation of the arm 10 will cause it to move to a certain extent along the trunnion due to travel on the threads, and the free end portion of the bushing which projects beyond the end of the opening 19, will allow the rubber to expand more easily in this region so that if the rubber is compressed by the shoulder 28, expansion of the rubber will occur outside the opening 19 without undesirably compressing the rubber bearing within the opening. Generally the free or projecting end of the rubber is desirable to permit the rubber to flow or expand in case the rubber is compressed by shoulder 28 and also because the space between the arm 10 and shoulder 28 provides substantial tolerances for manufacturing and assembling purposes.

Preferably the bushing 27 is composed of an oil resisting rubber such as neoprene or other synthetic rubber. The bar 11 may be constructed of round bar stock upset to form the shoulder 28 and flattened at the outer end to provide an apertured attaching portion. The parts preferably are assembled by placing the rubber bushing on the trunnion and then threading the trunnion into the threaded opening in the arm until the shoulder 28 is approximately in the position shown. The threaded end of the trunnion is then substantially spaced from the plug 15 so as to avoid any possible contact between the end of the trunnion and the plug during use of the joint and also to provide a space for lubricant. Thereafter, the bar 11 may be attached to the vehicle frame and the arm 10 to the steering link and once the parts are assembled, only a limited travel of the trunnion in the opening will occur, due to limited oscillation of the arm in steering of the vehicle.

The rubber bushing or bearing has a substantially close fit on the trunnion and in the opening so that it will take part of the bearing load and particularly act resiliently to permit rocking of either member longitudinally of the other without creating noise such as may occur when completely threaded bearings having large clearances between their outer and inner members are made to fulcrum about either of their ends so as to cause the other ends of the members to strike each other. Dimensions of the bushing may be such that lubricant forced under pressure through the fitting will travel along the threads and along either or both peripheral surfaces of the bushing, but the fit between the peripheral surfaces of the bushing and the trunnion and wall of the opening is sufficiently close to prevent undesirable escape of lubricant or ingress of water, dirt, or other objectionable matter.

Under normal action of the bearing with one or both peripheral surfaces of the rubber lubricated, wear on the bearing surfaces is prevented by the lubricant but if for any reason the lubricant is not present, such wear, at least for small oscillations, is prevented by movement within the rubber itself. At the same time the threaded portion of the bearing in addition to taking a part of the bearing load, acts to limit end play between the parts and to take end thrust.

In using the invention and depending upon the bearing loads and the effects thereof, it may be desirable to design the bearing so that the threaded portion thereof would be limited to a few threads and the rubber portion of the bearing would be long relative to the threaded portion, or in another type of connection, to design the bearing so as to have a large number of threads and a rubber bearing relatively short compared to the threaded portion, or to have the lengths of the threaded and rubber bearing portions vary in between these two sets of conditions.

Where it is not desirable or necessary to have the axes of the inner and outer members remain parallel or coinciding, for instance as in the linkage connections illustrated in Patent No. 2,305,880, the play between the threads would preferably be greater than where it is necessary for the axes to stay substantially aligned or parallel. Where it is desirable to have play in the threads to allow a greater relative movement of the inner and outer parts in the region of the rubber, a bushing composed of softer rubber and having a thicker wall may be preferable. On the other hand, where it is desirable to have less play in the threads to allow less movement in the region of the rubber, the latter preferably may be harder and have a thinner wall.

In Fig. 2, a U-bolt shackle is provided comprising a U-bolt 30 having both ends formed with trunnions. Each trunnion has a threaded portion 31 and a non-threaded portion 32 and at the end of the latter, an annular shoulder 33 is provided. At the end shown in cross section, the trunnion extends into an opening 34 in a hangar 35 which may be secured to a vehicle frame. A threaded bushing 37 having internal standard threads 38 and shallow, obtuse angle threads 39 on its outer periphery is threaded onto the trunnion and into the end of opening 34. At its outer end the bushing has a hexagonal head 42 and when the bushing is tightened forcefully against the end of the hangar, the bushing is locked against any accidental loosening. For convenience of manufacture, a welch plug 43 closes the end of the bushing and has a threaded opening 44 for receiving a grease fitting, whereby the bearing may be lubricated. A rubber bushing 46 is disposed in the opening 34 beyond the inner end of the bushing 37.

The lower end of the shackle bolt is connected in substantially the same way to an eye 50 of a leaf spring. In this case the bushings 37 and 46 are located within the eye. Assembly is effected by placing the ends of the U-bolt and rubber bushings in the openings and then threading the bushings 37 into the openings and simultaneously onto the ends of the bolt.

By having the ends of the U-bolt threaded for a short distance instead of the full length of the trunnion, the cost of forming the threads is reduced considerably. Furthermore, the present construction enables using smaller bar stock and forming the threads by a thread rolling operation, since the trunnion is not weakened by threads in the region where it is subjected to bending forces or in other words, in the region adjacent the shoulder 33. When the threads are thus formed only at the outer end of the trunnion and are rolled, the diameter of the bar stock may be substantially the pitch diameter of the threaded end, since enough metal is then present to form such threads by rolling.

Furthermore, in the present construction, the bolt may be formed with the shoulders 33 while the bolt is still in a straight condition and then the threads may be rolled and finally the bolt bent into U-shape. It is also practical in the present construction to form the shoulders 33 without heating the bar and then to bend the bar while cold. Altogether the cost of the U-bolt may be thus reduced considerably through saving in cost of manufacturing operations and a saving in material.

Although more than one form of the invention has been illustrated and described in detail, it will be apparent to those skilled in the art that various modifications may be made without departing from the scope of the claims.

What is claimed is:

1. An oscillatory joint comprising radially inner and outer relatively turnable parts having threaded bearing engagement so that oscillation occurs on the threaded bearing, and resilient bearing means on the inner part and located within the outer part and providing a resilient bearing between and substantially contacting both parts so as to modify the action of the threaded bearing.

2. An oscillatory connection comprising a radially outer part having an opening, an inner part having a trunnion extending into the opening, said outer part and inner part having a threaded bearing engagement extending partially over the length of the opening and trunnion, and a resilient bushing on the trunnion in another part of the opening and providing a resilient bearing between the parts.

3. An oscillatory connection comprising a radially outer part having an opening, an inner part having a trunnion extending into the opening, said outer part and inner part having a threaded bearing engagement extending partially over the length of the opening and trunnion, and a resilient rubber bushing on the trunnion at one end of the threaded bearing and within the opening and providing a resilient bearing between the parts.

4. An oscillatory connection comprising a radially outer part having an opening, said opening having a threaded portion and an enlarged portion at the end of the threaded portion, an inner part or trunnion extending into the opening and having a threaded portion threaded into the threaded portion of the opening, and a resilient bushing on the trunnion and in the enlarged portion of the opening and providing a resilient bearing between the parts at one end of the threaded portion.

5. An oscillatory connection comprising a radially outer part having an opening, said opening having a threaded portion and an enlarged portion at the end of the threaded portion, an inner part or trunnion extending into the opening and having a threaded portion threaded into the threaded portion of the opening, a resilient bushing on the trunnion in the enlarged portion of the opening and projecting beyond the outer end of the opening, and an annular shoulder on the trunnion for normally preventing movement of the bushing out of the opening.

6. An oscillatory connection comprising an inner part and an outer part, a bushing threaded into one end of the outer part and having internal bearing threads, and a resilient bushing disposed within the outer part beyond the inner end of the threaded bushing, the inner part having a threaded sector threaded into the threaded bushing and having a non-threaded sector extending through the resilient bushing to provide a resilient bearing in addition to the threaded bearing.

7. An oscillatory connection comprising an inner part and an outer part, a bushing threaded into one end of the outer part and having internal bearing threads, and a bushing disposed within the outer part beyond the inner end of the threaded bushing, the inner part having a threaded sector threaded into the threaded bushing and having a non-threaded sector extending through the second bushing to provide a non-threaded bearing in addition to the threaded bearing.

JOHN W. LEIGHTON.